(12) United States Patent
Shay

(10) Patent No.: US 7,331,359 B2
(45) Date of Patent: Feb. 19, 2008

(54) VALVE WITH BI-LOADING SEAL

(75) Inventor: Christopher M. Shay, Fredonia, WI (US)

(73) Assignee: Kohler Co., Kohler, WI (US)

( * ) Notice: Subject to any disclaimer, the term of this patent is extended or adjusted under 35 U.S.C. 154(b) by 281 days.

(21) Appl. No.: 11/109,359

(22) Filed: Apr. 19, 2005

(65) Prior Publication Data

US 2006/0231141 A1   Oct. 19, 2006

(51) Int. Cl.
*F16K 27/06* (2006.01)

(52) U.S. Cl. .............. 137/454.2; 137/454.5; 277/651

(58) Field of Classification Search .......... 137/454.2 I, 137/454.5 X; 277/638, 639, 644, 651 X
See application file for complete search history.

(56) References Cited

U.S. PATENT DOCUMENTS

| | | | |
|---|---|---|---|
| 2,191,044 A * | 2/1940 | Seligman | 277/639 |
| 2,935,293 A | 5/1960 | Monson | |
| 2,994,343 A | 8/1961 | Banks | |
| 3,114,560 A | 12/1963 | Dunn | |
| 3,144,878 A | 8/1964 | Williams | |
| 3,519,279 A * | 7/1970 | Wagner | 411/542 |
| 3,532,350 A | 10/1970 | Kaufman | |
| 3,572,735 A | 3/1971 | Dryer | |
| 3,831,621 A | 8/1974 | Anthony et al. | |
| 4,397,330 A | 8/1983 | Hayman | |
| 4,651,770 A | 3/1987 | Denham et al. | |
| 4,821,765 A | 4/1989 | Iqbal et al. | |
| 4,880,209 A * | 11/1989 | Bernat | 251/363 |
| 4,896,693 A | 1/1990 | Rodriguez | |
| 4,924,903 A | 5/1990 | Orlandi | |
| 5,107,884 A | 4/1992 | Orlandi | |
| 5,176,168 A | 1/1993 | Stoll et al. | |
| 5,234,020 A | 8/1993 | Orlandi | |
| 5,348,042 A | 9/1994 | Wagner et al. | |
| 5,398,717 A | 3/1995 | Goncze | |
| 5,531,524 A | 7/1996 | Brouwer | |
| 5,611,628 A | 3/1997 | Brouwer | |
| 5,730,444 A * | 3/1998 | Notter | 277/554 |
| 5,832,952 A | 11/1998 | Cook et al. | |
| 6,016,830 A | 1/2000 | Niakan et al. | |
| 6,290,240 B1 * | 9/2001 | Knapp | 277/651 |
| 6,382,229 B1 | 5/2002 | Baker et al. | |
| 6,422,268 B1 | 7/2002 | Fleig et al. | |
| 6,685,197 B1 | 2/2004 | Rakauskas | |

FOREIGN PATENT DOCUMENTS

DE      4343464       6/1995
WO   WO 2005/021985   3/2005

* cited by examiner

*Primary Examiner*—Stephen M. Hepperle
(74) *Attorney, Agent, or Firm*—Quarles & Brady LLP

(57) ABSTRACT

A fluid control valve has at its lower inlet end a bi-loading seal. The seal is generally ring shaped in top view. However, it has a first flexible load section for sealing the stationary disk with respect to the housing and a second load section having an annular insert that in cross-section is hook-shaped to form a bend of more than 90 degrees. The insert can be molded within the resilient body of the seal so that its outer rim is disposed at a circular shoulder that bears against a seal stop of the housing. A high load can thus be applied between the bearing shoulder and seal stop to achieve a tight seal, while a lower load can be applied between the flexible, unrigidified part of the seal and a stationary valve disk.

12 Claims, 2 Drawing Sheets

VALVE WITH BI-LOADING SEAL

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

The invention concerns fluid control valves, such as water control valves used in plumbing fixtures, and seals used therewith.

Valve cartridges and the like are well known for use in faucets and other plumbing fixtures. See e.g., U.S. Pat. No. 5,398,717. Generally, such valves include a cartridge housing with a valve stem that can rotate inside the housing to control a rotatable disk that moves over a stationary disk. The stationary and rotatable disks typically have holes through them that when aligned permit flow, and when completely not aligned shut off flow. These disks are preferably made of ceramic because ceramics are resistant to friction and wear and thus provide for prolonged life of the valve.

Various seals and o-rings are provided between the housing, valve stem, and stationary disk so as to prevent leaking. In particular, the seal between a plumbing fixture body and the valve cartridge housing is typically achieved by a resilient ring that seals by compression against the stationary disk and a seat of the fixture body. Insufficient compressive force can cause the valve to leak at the connection to the fixture. Too much compressive force can create undesirable resistance to rotation, making the faucet difficult to turn on or off, and increasing the rate of wear.

One attempt at addressing problems with the lower seal is disclosed in U.S. Pat. No. 6,422,268. In that patent, a valve cartridge is disclosed with a sealing ring reinforced by a reinforcing ring having a generally right angle cross-section. The sealing ring is constructed so that an end of the reinforcing ring bears against a ledge of the valve housing so that the brunt of the compressive forces are transferred to the housing rather than against the stationary control disk. The more flexible upper side of the sealing ring seals against the fixed/stationary disk of the valve under decreased loading. However, even with such a structure there are problems. In this regard, in the presence of pressure spikes the sealing ring can shear at its inner end.

Hence, a need still exists for improved cartridge type fluid control valves, particularly with respect to the structure and performance of the lower seal.

SUMMARY OF THE INVENTION

The invention provides a valve having a bi-loading seal with improved construction. The seal resists shearing and failure from high pressure fluctuation at the inlet of the valve, while maintaining good sealing and extended life characteristics.

In one aspect, the invention provides a valve having a valve housing, a stationary valve element having a hole there through, a moveable valve element positioned in the valve housing for regulating fluid flow through the valve in response to movement of the moveable element adjacent the stationary element, an operating member extending into the valve housing for moving the moveable element, and a seal proximate an inlet side of the stationary valve element and having a first flexible load section for sealing the stationary valve element with respect to the valve housing and a second load section having rigidifying member forming a bend that in vertical cross section extends for more than 90 degrees.

In preferred forms the rigidifying member is an annular member having, in vertical cross-section, a first leg and a second leg extending at an angle between the first and second legs of less than 90 degrees, the first and second legs being joined by an intermediate portion extending there between, the second leg is parallel to the first leg or within ten degrees of being parallel to the first leg, the seal is in the form of a ring where a leg terminates at an external surface of the seal so as to bear against the housing, and/or the rigidifying member has an essentially hook-shaped vertical cross-section.

In other preferred forms the rigidifying member is comprised of a metal such as brass. There also can be a radially inward flexible portion of the seal extending further into the valve housing than an uppermost portion of the rigidifying member.

In other refinements the seal abuts a downwardly facing circular ledge formed along an interior of the housing, the second load section is a generally annular body extending from a second side to an intermediate region having a circular bearing shoulder, and the first load section extends from the intermediate region to a first side opposite the second side. The rigidifying member can be associated with the bearing shoulder at the intermediate region and the first and second sides are resilient.

In another aspect of the present invention there can be an annular seal having a first flexible load section and a second load section, the second load section having a rigidifying member associated with a bearing surface at an intermediate region located between a resilient first side of the seal where the first load section terminates and a resilient second side of the seal where the second load section terminates, wherein the rigidifying member is an annular member having a vertical cross-section forming a bend of more than 90 degrees.

These valves provide all of the state of the art advantages of cartridge valves of this type, while also reducing failures due to wear and shear. Further, they allow for a high compressive load to be used to avoid leaks, with less adverse consequences.

Other advantages of the invention will be apparent from the detailed description which follows and accompanying drawings. What follows is merely a description of a preferred embodiment of the present invention. To assess the full scope of the invention the claims should be looked to as the preferred embodiment is not intended to be the only embodiment within the scope of the claims.

DETAILED DESCRIPTION OF THE PREFERRED EMBODIMENT

Figure 1:
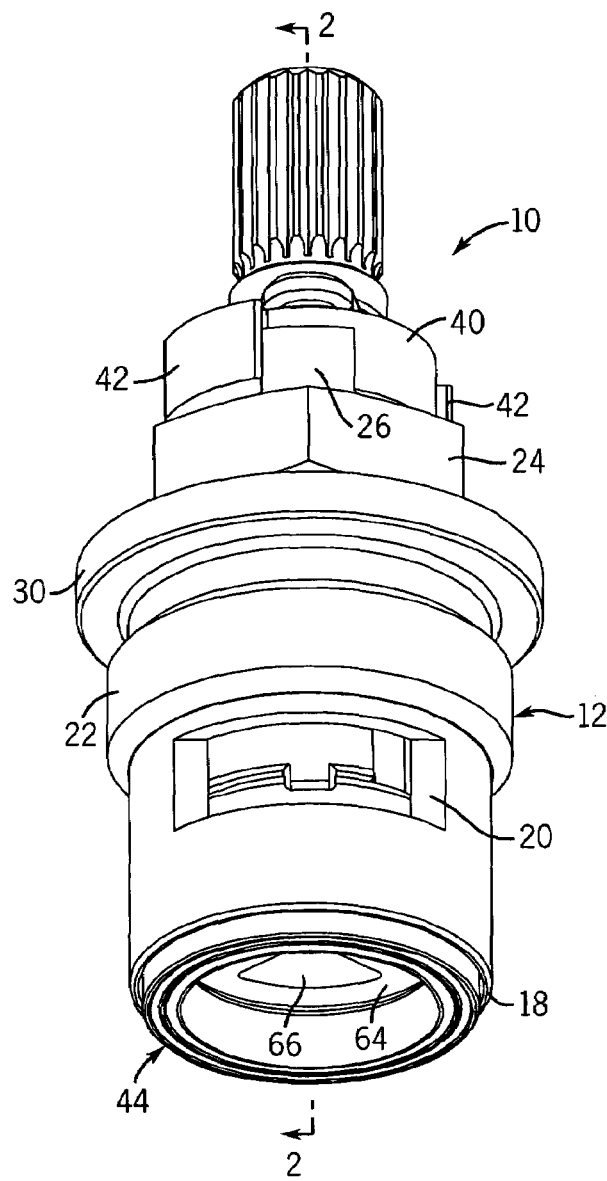
FIG. 1 is a lower, frontal, perspective view of a valve according to the present invention.
Figure 2:
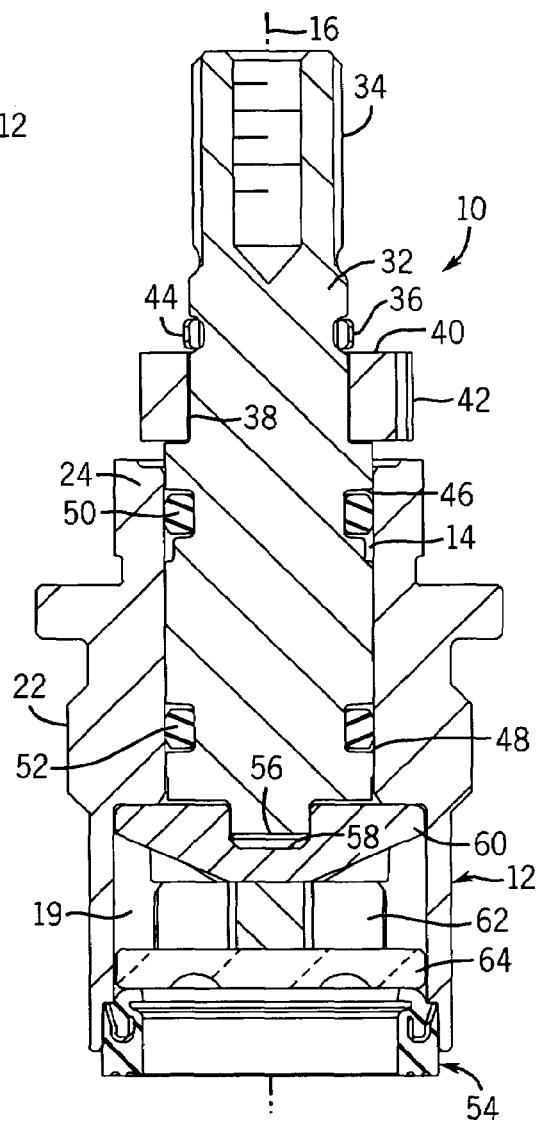
FIG. 2 is a sectional view thereof taken along line 2-2 of FIG. 1.

Referring to FIGS. 1 and 2, the valve cartridge assembly is referred to generally by reference number 10 and includes an annular housing body 12 with an internal cavity 14 disposed along a main axis 16 and in communication with a bottom inlet 18 and two opposite side outlets 20 (one shown). As such, the pathway through the valve is from the inlet 18 up through the a lower portion 19 of the cavity 14 and out through the outlets 20. The housing 12 also defines a threaded section 22 for mating with the fixture (not shown) and a hex section 24 for fastening it in place with a wrench. Two stop tabs 26 (one shown) spaced apart 180 degrees extend upward from the top of the housing. The housing has a larger diameter flange 30 between the threads and the hex section under which sits an o-ring (not shown).

A spindle/valve stem 32 is disposed along the axis 16 inside the housing 12 and has a splined upper end 34 for mounting a faucet handle (not shown). Below the splined section, the valve stem 32 has a groove 36 adjacent to a square section 38. The square section 38 mounts a limiter 40 with two radially extending ears 42 that interfere with the stop tabs 26 of the housing 12 to limit rotation of the valve stem 32 in each direction. The limiter 40 is preferably designed to be reversible, by remounting it with the ears 42 to the other sides of the stop tabs 26, so that the valve stem 32 can work with either a left-hand or a right-hand faucet, or perhaps corresponding to hot or cold faucets.

A small snap clip 44 fits into the groove 36 to mount the limiter 40. Two grooves 46 and 48 in the mid-section of the valve stem 32 receive a ring bearing 50 and an o-ring 52, respectively. The inlet 18 of the housing 12 is sealed by an annular seal 54, discussed in detail below.

At the bottom of the valve stem 32 is a drive bar 56 that is received in a slot 58 of a drive disk 60. The drive disk 60 has two projections (not shown) which fit into two slots (not shown) of a bowtie-shaped rotatable disk 62. The downward face of the rotary disk 62 is flat and smooth and slides against the smooth upper face of a stationary disk 64 which is held fixed against rotation with respect to the housing 12 by the engagement of two ears (not shown) being received in slots of the housing 12. The stationary disk 64 has two triangular openings 66 (one shown).

In a closed position of the valve (shown in FIG. 2), the wings of the rotary disk 62 align with the openings 66 of the stationary disk 64 so that flow is blocked. By turning the valve stem 32 a ¼ turn to its open position, the rotary disk 62 is rotated to align with the spaces between its wings with the openings 66 and the outlets 20 of the housing 12 and thereby allow flow from the inlet 18 to the outlets 20.

Figure 3:
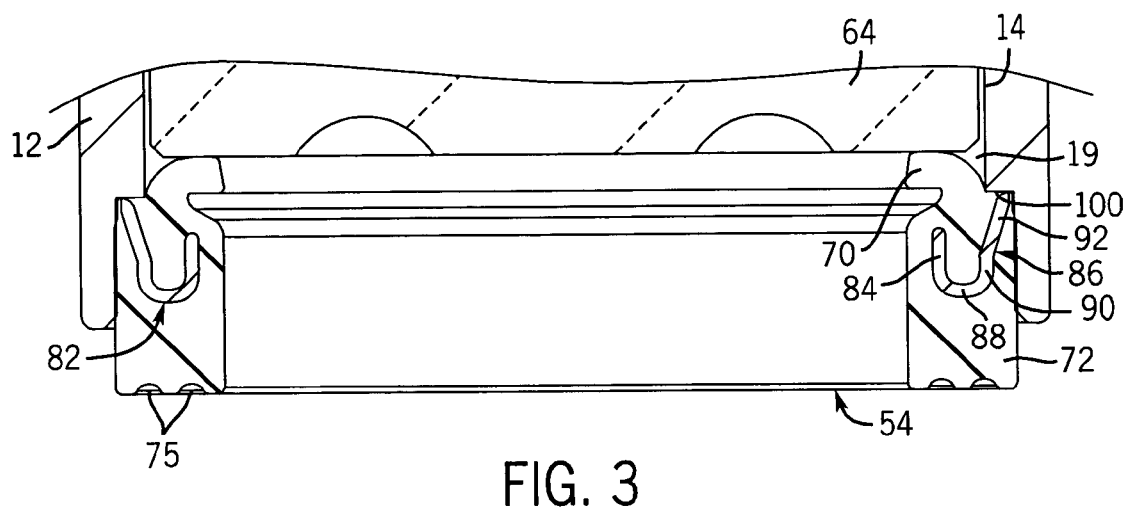
FIG. 3 is an enlarged partial sectional view showing the interface of a seal at the inlet of the valve.
Figure 4:
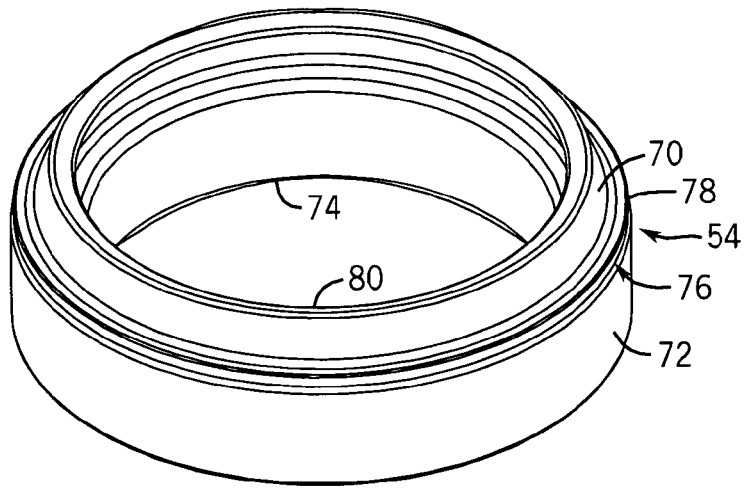
FIG. 4 is a top frontal perspective view of the seal in isolation.
Figure 5:
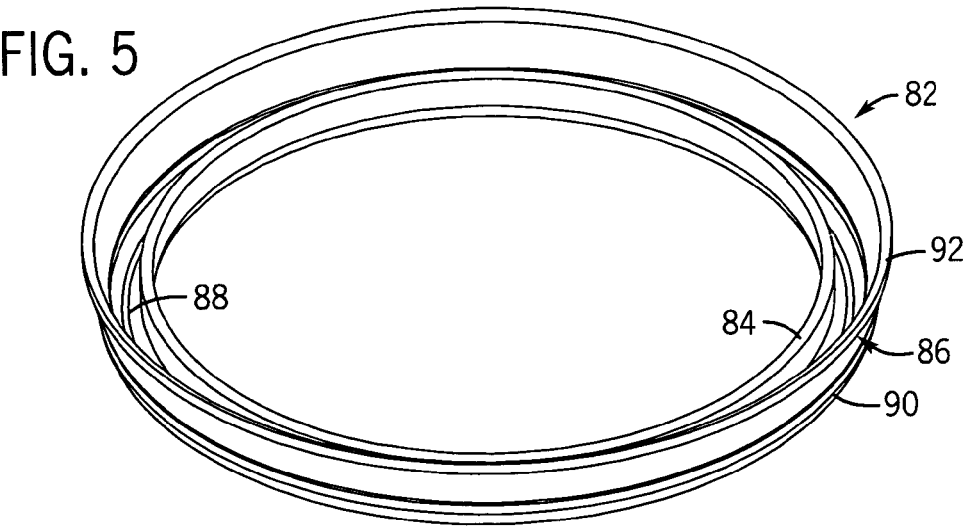
FIG. 5 is another perspective view of the seal insert in isolation.

With particular reference to FIGS. 3-5, the construction and operation of the seal 54 will now be discussed. The seal 54 has a resilient body, preferably of EPDM, and is a bi-loading seal in that has a first load section 70 and a second load section 72. The second load section 72 extends from a resilient bottom side 74, having two concentric grooves 75, to an intermediate region 76, which defines a circular bearing shoulder 78, between the bottom side 74 and a resilient upper side 80 where the first load 70 section terminates. The first load section 70 is thinner than the second load section 72 and tapers or cants inwardly toward the center of the seal 54, which would be about at the main axis 16 when assembled to the valve.

The second load section 72 includes an annular rigidifying insert 82. The rigidifying insert 82 has a cross-section with a first leg 84 and a second leg 86 joined by an intermediate portion 88 extending therebetween. The second leg 86 is about parallel to a first leg portion 90, and a second leg portion 92 extends at an angle with respect to the first leg portion 90, preferably outward from a center of the seal 54. The legs 84 and 86 thus form a hook-shape, or possibly a "J" or "U" shape, in cross-section which bends through more than 90 degrees, or put another way, the included angle between the legs 84 and 86 is less than 90 degrees. The bent configuration strengthens the insert 82 and provides for increased surface area for bonding of the insert 82 to the resilient body of the seal 54.

The rigidifying insert 82 positioned in the seal 54 in the second load section at or near the intermediate region 76 and extending essentially down less than half way between the bottom side 74 and the bearing shoulder 76. It is oriented so that the concave mouth of the insert 82 opens toward the upper side 80 and the first load section 70. This orientation further aids in resisting separation of the resilient body of the seal.

The upper end or rim of leg 86 of the insert 82 terminates at the bearing shoulder 78, and can extend to the external surface of the shoulder or can be covered by a small amount of resilient material. When the seal 54 is mounted to the valve, the shoulder 78, as bolstered by the end of the insert 82, will abut a circular seal stop 100 formed at the inside of the housing 12 near the inlet 18 axially below the stationary disk 64. In this way, the rigidified second load section of the seal 54 will transfer high compressive forces to the seal stop 100. The non-rigidified, flexible first load section will seal against the underside face of the hole plate disk 64, but under much less loading. As depicted in FIG. 3, this section will deflect and conform to provide a good seal without excessive force.

Thus, the seal 54 of this construction will transfer high loads to the housing rather than the ceramic disks. This allows for a smoother feeling turning motion without the need for excessive force and also prolongs the life of the moving components and those in contact therewith. Moreover, both the upper and bottom sides of the seal are resilient and flexible so that good sealing can be achieved at both sides. Also, the construction of the insert and its orientation in the seal 54 provide for improved adhesion of the two parts and decreased chance of separation of the resilient material and thus failure of the seal.

The body of the seal 54 is preferably a suitable resilient material, such as EPDM. The insert 82 is preferably a metal, such as brass, suitable for insert molding the insert within the seal 54. The housing 12 and valve stem 32 are also preferably brass. The drive disk 60 can be a rigid plastic, and the rotary disk 62 and stationary disk 64 are preferably ceramic. Other materials with suitable rigidity or resiliency may be used.

While there has been shown and described what is at present considered the preferred embodiment of the invention, various changes and modifications can be made therein without departing from the scope of the invention defined by the appended claims. For example, the insert need not be only J-shaped or U-shaped. Other hook shapes should also suffice.

Therefore, various alternatives and embodiments are contemplated as being within the scope of the following claims particularly pointing out and distinctly claiming the subject matter regarded as the invention.

INDUSTRIAL APPLICABILITY

The invention provides an improved valve, and seal construction for use therewith, such as used in controlling the flow of water in faucets and other plumbing fixtures.

I claim:

1. A valve, comprising:
   a valve housing;
   a stationary valve element positioned in the valve housing and having a hole there through;
   a moveable valve element also positioned in the valve housing and for regulating fluid flow through the valve in response to movement of the moveable element adjacent the stationary element;

an operating member extending into the valve housing for moving the moveable element; and a seal proximate an inlet side of the stationary valve element and having a first flexible load section for sealing the stationary valve element with respect to the valve housing and a second load section having rigidifying member forming a bend that in vertical cross section extends for more than 90 degrees;

wherein the rigidifying member has an essentially hook-shaped vertical cross sectional appearance;

wherein the seal is in the form of a ring in which the rigidifying member has an upper end which terminates adjacent an external surface of the seal; and wherein the second load section is a generally annular body extending from a second side to an intermediate region having a circular bearing shoulder defined by said external surface of the seal, and wherein the first load section extends from the intermediate region to a first side opposite the second side and said upper end terminates adjacent the intermediate region's bearing shoulder.

2. The valve of claim 1, wherein the rigidifying member is an annular member having, in vertical cross-section, a first leg and a second leg extending at an angle between the first and second legs of less than 90 degrees, the first and second legs being joined by an intermediate portion extending therebetween.

3. The valve of claim 2, wherein the second leg is parallel to the first leg or within ten degrees of being parallel to the first leg.

4. The valve of claim 2, wherein the rigidifying member has an essentially J-shaped or U-shaped vertical cross sectional appearance.

5. The valve of claim 1, wherein the rigidifying member is comprised of a metal.

6. The valve of claim 5, wherein the rigidifying member is made from brass.

7. The valve of claim 1, wherein the seal is a resilient material and the rigidifying member is a metal insert.

8. The valve of claim 1, wherein a radially inward flexible portion of the seal extends further into the valve housing than an uppermost portion of the rigidifying member.

9. The valve of claim 1, wherein the seal abuts a downwardly facing circular ledge formed along an interior of the housing.

10. The valve of claim 1, wherein the rigidifying member is associated with the bearing shoulder at the intermediate region and wherein the first and second sides are resilient.

11. The valve of claim 10, wherein the rigidifying member extends less than half way between the second side and the bearing shoulder at the intermediate region.

12. The valve of claim 1, wherein the rigidifying member opens toward the stationary valve member.

\* \* \* \* \*

UNITED STATES PATENT AND TRADEMARK OFFICE
CERTIFICATE OF CORRECTION

| | | |
|---|---|---|
| PATENT NO. | : 7,331,359 B2 | Page 1 of 1 |
| APPLICATION NO. | : 11/109359 | |
| DATED | : February 19, 2008 | |
| INVENTOR(S) | : Christopher M. Shay | |

It is certified that error appears in the above-identified patent and that said Letters Patent is hereby corrected as shown below:

In claim 1, at column 5, line 8, insert --a-- before "rigidifying".

Signed and Sealed this

Third Day of June, 2008

JON W. DUDAS
*Director of the United States Patent and Trademark Office*